United States Patent

[11] 3,544,728

[72] Inventors Dennis L. Rodkin
Piscataway, New Jersey;
Laurance A. Weber, Wheaton, Illinois

[21] Appl. No. 728,566
[22] Filed May 13, 1968
[45] Patented Dec. 1, 1970

[73] Assignee Bell Telephone Laboratories, Incorporated
Murray Hill, New Jersey
a corporation of New York

[54] PBX TELEPHONE SYSTEM WHEREIN SWITCH UNITS SERVED THROUGH DIFFERENT CENTRAL OFFICES ARE CONTROLLED BY CONTROL UNIT AT ONE CENTRAL OFFICE
10 Claims, 15 Drawing Figs.

[52] U.S. Cl. 179/18
[51] Int. Cl. H04m 7/14
[50] Field of Search 179/18(P&I), 18, 42, 41, 41(A), 26, 27.03, 27.02

[56] References Cited

UNITED STATES PATENTS 3,350,509 10/1967 Lee et al. 179/18(P&I)
3,231,684 1/1966 Borgstroem et al. 179/26

*Primary Examiner*—Kathleen H. Claffy
*Assistant Examiner*—Thomas W. Brown
*Attorneys*—R. J. Guenther and James Warren Falk

ABSTRACT: A switching arrangement for a communication system is described which permits private branch exchanges (PBX's) served through a central office in one exchange area to be controlled by facilities in a remote exchange area.

INVENTORS D. L. RODKIN
L. A. WEBER
BY R.C. Winter
ATTORNEY

PBX TELEPHONE SYSTEM WHEREIN SWITCH UNITS SERVED THROUGH DIFFERENT CENTRAL OFFICES ARE CONTROLLED BY CONTROL UNIT AT ONE CENTRAL OFFICE

BACKGROUND OF THE INVENTION

Private branch exchange systems, hereinafter termed PBX's, are telephone switching systems which are designed to serve a relatively few stations assigned to a single customer. Originally, these equipments required operator assistance for connections to or from central office facilities. The PBX extensions were considered primarily as only part of the PBX and not as part of the nationwide telephone network; the operator was the interface with the outside network.

Traditionally PBX's have had the entire exchange equipment, including the control circuitry and the switching network, located on the customer's premises. An early development was to allow PBX extensions to dial outward calls directly, but with toll restrictions imposed so that no calls could be directly dialed by an extension if toll charges would be involved. These calls would still have to go through the operator.

More recent PBX installations include arrangements for cooperating with the associated central office facilities to provide for both unlimited outward dialing by extensions and direct inward access to an extension from the national network, thus bypassing the operator. The provision of unlimited dialing is possible by the inclusion of automatic identified outward dialing equipment (IOD) which associates the particular extension placing the call with the automatic message accounting equipment (AMA) in the central office. Accordingly, a toll call can be billed directly to an extension instead of just to the PBX trunk. The provision of direct inward dialing (DID) has also been made possible by assigning each PBX extension a unique national dialing code and by modifications in the central office equipment.

For both of these services there must exist a much closer relationship between the central office and the PBX on the customer's premises than had priorly been the case. One recently developed PBX, known as the No. 101 Electronic Switching System, provides these features, and numerous others, by utilizing recently developed electronic techniques, including techniques of stored program control of telephone systems. The system is disclosed, inter alia, in R. C. Gebhardt et al. U.S. Pat. No. 3,225,144, issued Dec. 21, 1965, and F. S. Vigliante et al. U.S. Pat. No. 3,268,669, issued Aug. 23, 1966. In this system the relationship between the PBX and the central office through which it is normally reached is even closer as the system comprises switch units, which are at the customer's premises, and a control unit which, unlike prior systems, is not at the customer's premises but instead at the central office. Accordingly, the central office can very readily obtain the information necessary to provide the improved dialing in and out services discussed above. Indeed the equipment is exceedingly flexible in providing other special service features, including tie trunks, conferencing arrangements, etc.

The control unit is described in the above-mentioned Vigliante et al. patent and the switch units in the Gebhardt et al. patent. As therein set forth the system comprises a plurality of independent switch units, each serving a distinct group of stations. A scanning arrangement detects changes in supervisory states of the station lines. A time division switching network directs intelligence signals between stations, and the control unit, common to all of the switch units, responds to a request for service from one of the PBX stations by transmitting control signals to the switch unit for directing connection of the calling station to the called station through the switching network.

In such a system a switch unit may serve a group of stations assigned to a single PBX customer, and a single control unit serves a number of switch units. Each switch unit is restricted to serving a maximum number of stations, the upper limit being dictated by the nature of the internal time division operation and not by control unit parameters. The control unit utilizing electronic components can tolerate many times the amount of traffic which a single switch unit can provide. Thus a particular advantage of this system arrangement resides in the ability of the common control unit to accommodate a large number of individual switch units.

A logistical problem is evident if such a system approach is adopted. Consider, for example, that two adjacent telephone exchanges serve approximately the same number of stations from their respective central offices. A recent demand for PBX service in the area warrants the installation of an electronic system, but the number of PBX subscribers in either one of the exchanges would not utilize a control unit to the extent required to make the operation economical.

SUMMARY OF THE INVENTION

The problem presented by the hypothetical case is solved in accordance with an illustrative embodiment of this invention by providing switch units in one exchange, termed the foreign exchange, to serve the demand existing therein and to give the stations terminating on these switch units access to the outside world through the central office in the same exchange area. However, operation of the switch units is under direct control of a control unit located in the other exchange, termed the local exchange. In this fashion, use of the control unit will be shared by switch units in the local and foreign exchange areas, thereby utilizing the electronic facilities at an economic level.

Trunking and billing functions are performed by the central office in the same exchange area, but all information necessary to the performance of these functions for a foreign exchange switch unit is received in the corresponding central office via the control unit in the local exchange area.

Because the trunking and billing are performed in the central office in the same area with the switch unit, the close cooperation between PBX and central office discussed above is attained, even though the actual PBX control is associated with another central office. This operation, however, requires a large quantity of data to be transferred between the two central offices or exchanges, and specifically between the control unit at one office and the other office. This data includes the direct inward dialing (DID) information whereby operator intervention is obviated, the identified outward dialing (IOD) information for billing purposes, and various trunk supervisory messages.

In accordance with an aspect of our invention, switch units are connected by central office trunks to the switching networks of different central office exchanges while still all controlled by a single control unit associated with only one of these exchanges. The control data necessary to be transferred between the exchanges is multiplexed, in accordance with a specific illustrative embodiment of our invention, on a high speed, bilateral, data link between the local exchange control unit and the foreign exchange central office. Accordingly, even though connections are established by central office trunks from the foreign exchange central office to extensions on the switch unit associated with it, information as to the availability of that extension is kept in the control unit of the local exchange central office and that connection is established under control from the local exchange.

Specifically in this illustrative embodiment a first data link between the control unit and the foreign exchange switch unit is used for exchanging supervisory and control information independent of the foreign exchange central office, including the provision of dial tone and reception of dial pulses directly by the control unit, and a second data link between the foreign exchange central office and the local exchange control unit transfers trunk control signals and information for both direct inward dialing and identified outward dialing.

DRAWING

Figure 2:
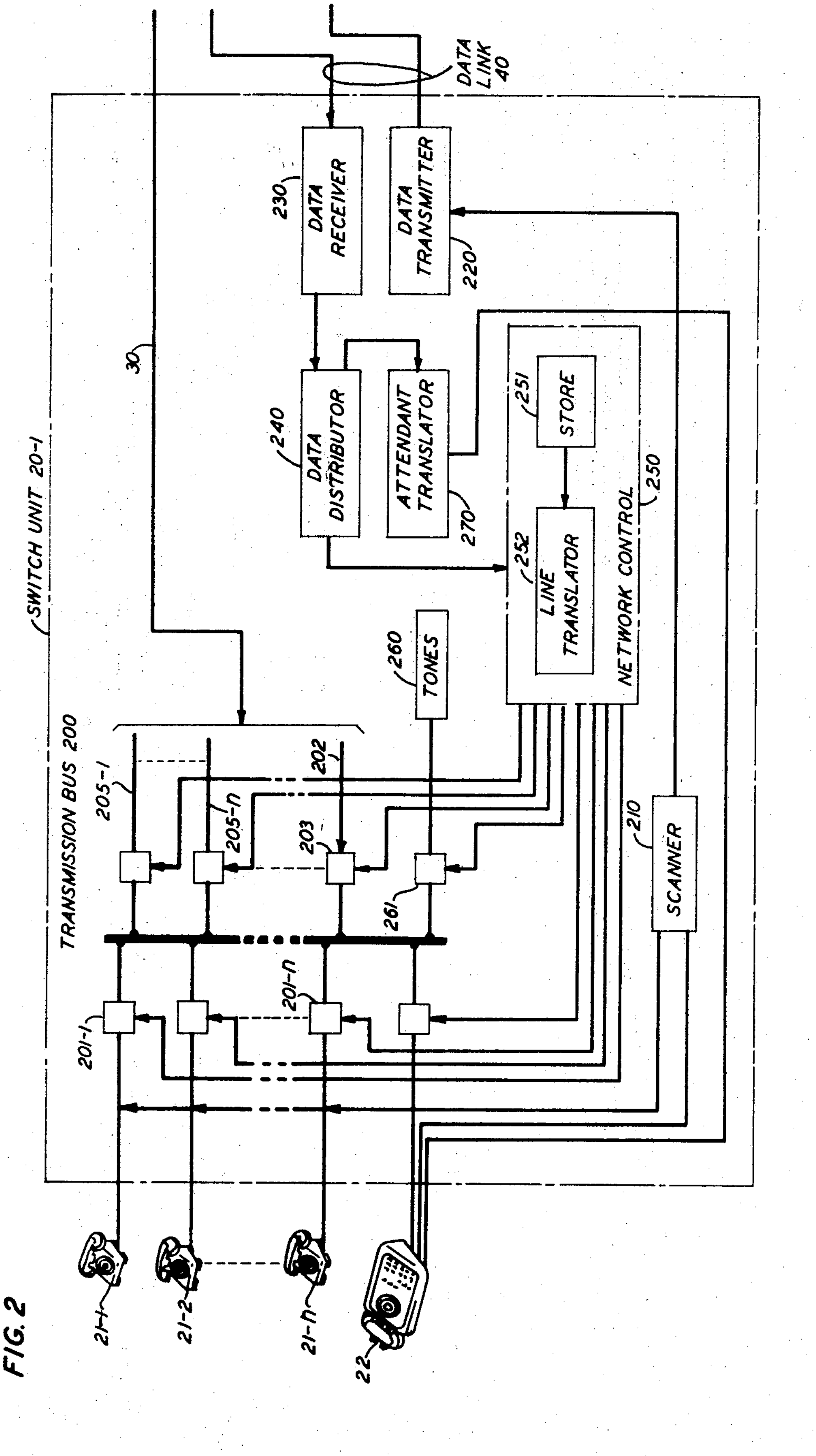
FIG. 2 depicts the principle characteristics of one private branch exchange switch unit contained in the system illustrated in FIG. 1.
Figures 3, 11:
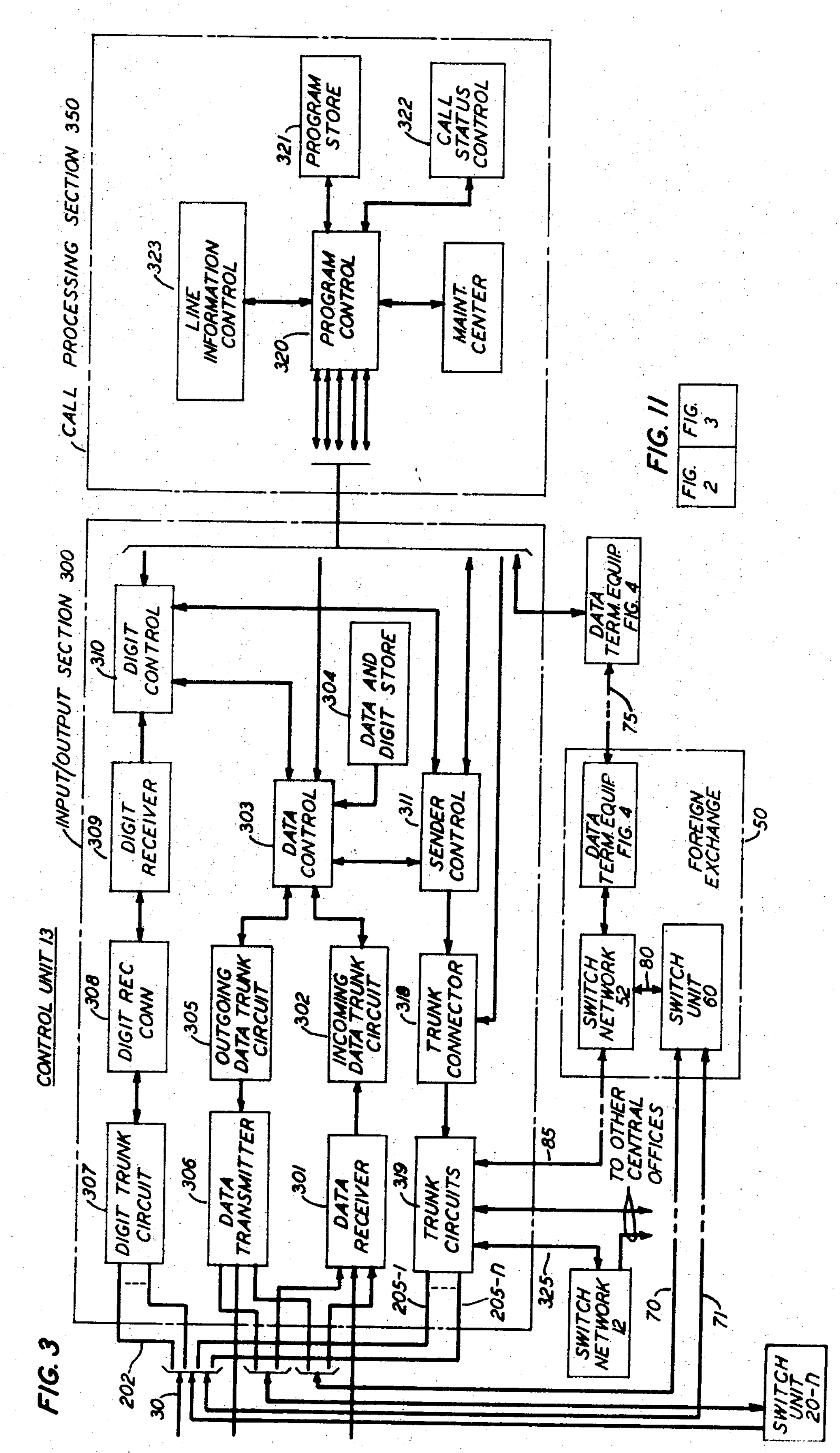
FIG. 3 depicts the principle characteristics of the private branch exchange control unit contained in the system illustrated in FIG. 1.
Figure 4:
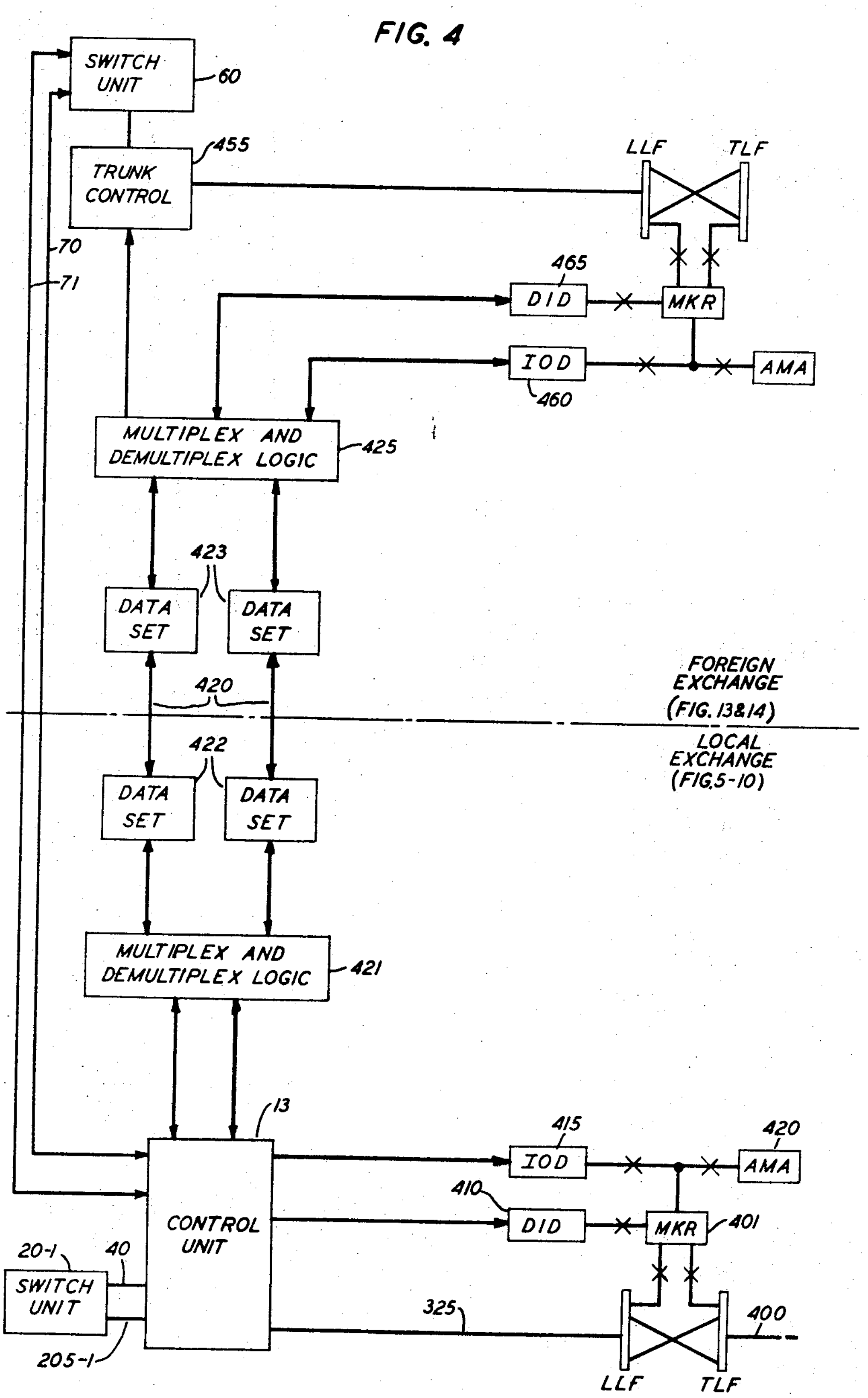
FIG. 4 depicts facilities for transferring data between local and foreign exchanges of the system depicted in FIG. 1 in accordance with this invention.
Figures 5, 12:
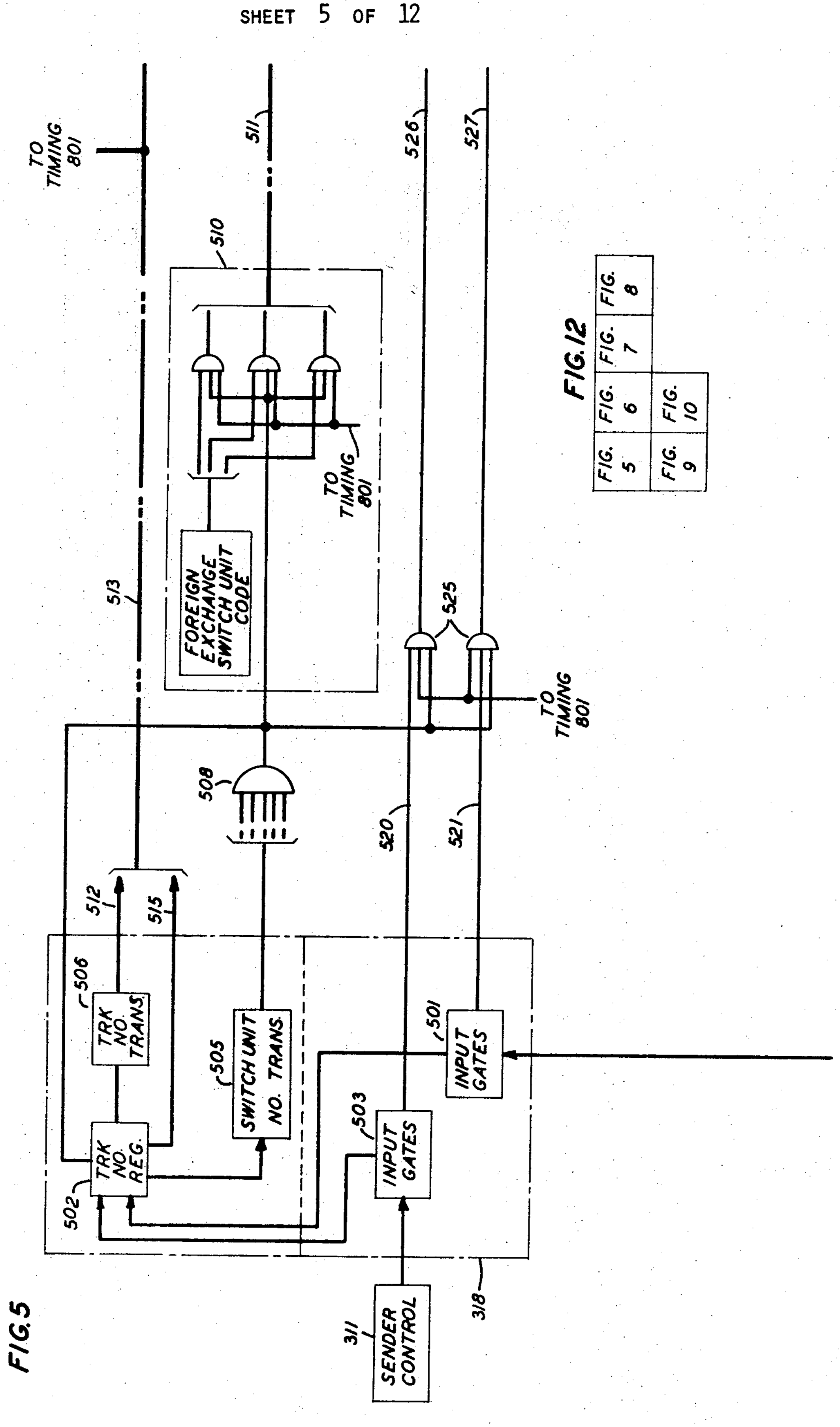
Figures 13, 15:
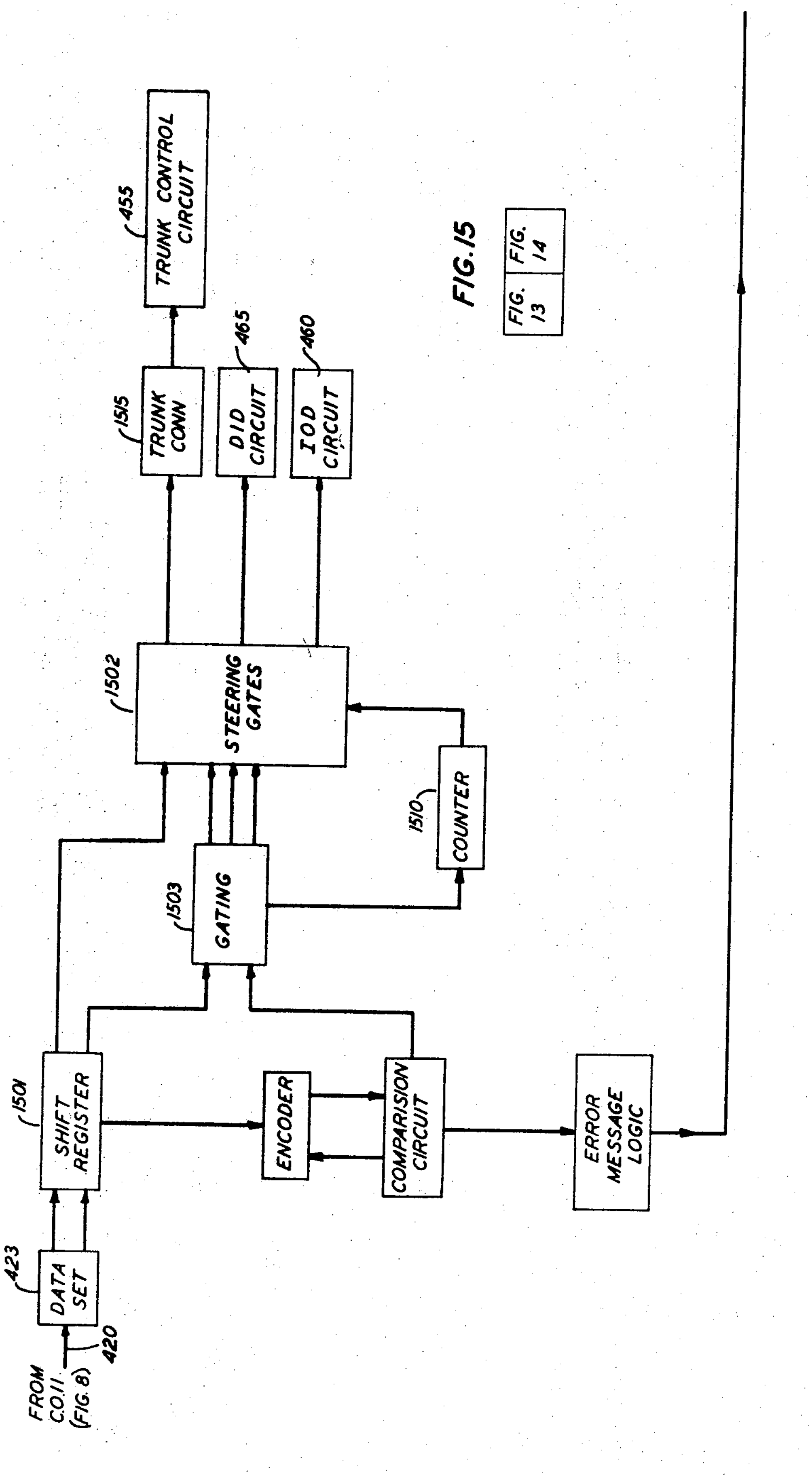
Figure 14:
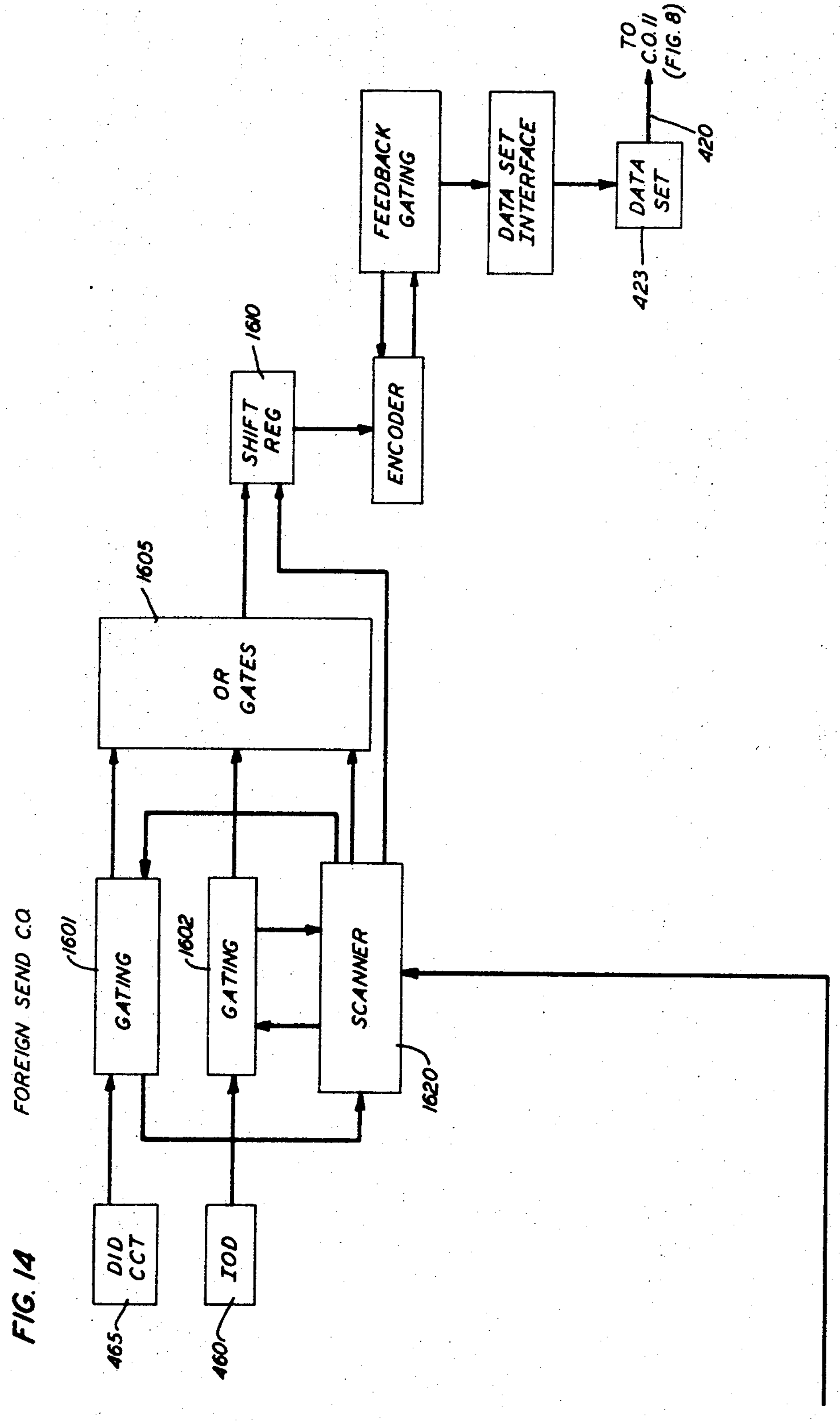

FIGS. 5—10 together provide a schematic representation in greater detail of the local exchange facilities depicted in FIG. 4;

FIG. 11 is a key chart for assembling FIGS. 2 and 3;

FIG. 12 is a key chart for assembling FIGS. 5—10;

FIGS. 13 and 14 together provide a representation in greater detail of the foreign exchange facilities depicted in FIG. 4; and FIG. 15 is a key chart for assembling FIGS. 13 and 14.

Figure 1:
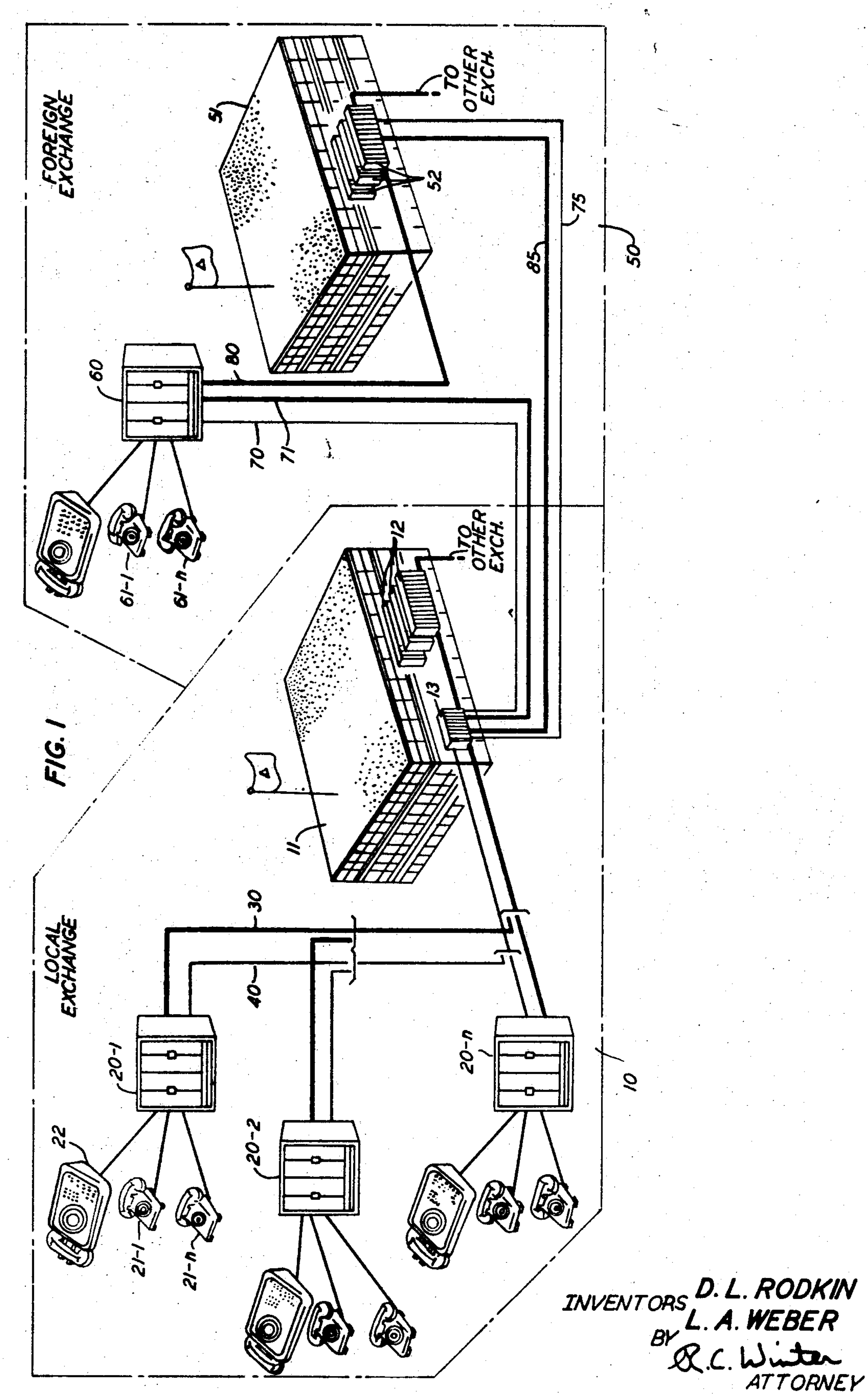
FIG. 1 is a block diagram representation of a communication system incorporating this invention.

General System Operation (FIG. 1)

The communication system depicted in FIG. 1 comprises a local telephone exchange 10 and a foreign telephone exchange 50, each of which provides the normal telephone services to a distinct geographical area and is connected to other exchanges via trunks. Each of the exchange areas 10 and 50 contain a central office 11 and 51, respectively, which serves telephone lines and trunks through central switching facilities 12 and 52 respectively.

In addition to regular telephone service, the system depicted in FIG. 1 is also arranged to serve a number of private branch exchanges particularly designed to provide service to business customers. In order to satisfy current demand for such service it is desirable to provide equipment on the customer's premises of minimum size and requiring a minimum of maintenance. For this reason electronic equipment has been devised which permits the installation on the customer's premises to contain only the switching portion of the PBX with the control portion being located at the central office and arranged to serve a plurality of remote switch units. Thus in local exchange 10, three private branch exchange units are depicted, the control unit 13 being located at central office 11 and the switch units 20–1, 20–2 and 20–$n$ being located on the respective customer's premises.

Each switch unit serves a plurality of extension telephone stations such as stations 21—1 through 21–$n$ served by switch unit 20—1. An attendant console 22 is available at switch unit 20—1 to accommodate unusual service requests. All requests for service are communicated through the switch unit on the customer's premises to control unit 13 at central office 11 via data links, such as link 40 joining switch unit 20—1 to control unit 13. Call connections involving PBX stations such as 21—1 and 21–$n$ are completed to the outside world through the corresponding switch unit 20—1 and central office 11 via trunks 30.

The foreign exchange 50 corresponds in facilities to local exchange 10 with the exception that a control unit is not included in central office 51 to serve the PBX customer represented by switch unit 60 serving stations 61–1 through 61–$n$. Instead, in accordance with the illustrative embodiment described hereinafter, switch unit 60 is controlled by control unit 13 located in exchange area 10. Central office trunks 80 serving switch unit 60 are connected to switching network 52 at the foreign exchange central office 51, which in turn is connected via link 75 and interoffice trunks 85 to control unit 13 in local exchange central office 11. Data link 70 and digit trunks 71 connect foreign exchange switch unit 60 directly to local exchange control unit 13.

Switch Unit (FIG. 2)

For all practical purposes the switch units on the customer's premises, as depicted in the system of FIG. 1, are identical. Thus switch unit 20–1, illustrated in detail in FIG. 2, represents the composition of any one of the switch units depicted in FIG. 1. Switch unit 20–1 is essentially as described in detail in the aforementioned R. C. Gebhardt et al. patent, but for purposes of understanding the overall system operation, a brief description of the switch unit is provided.

The switch unit employs time division switching which is based on the principle that periodic samples of an information signal are sufficient to completely define the signal and that such samples, gleaned from a multitude of signal sources, may be transmitted in a regular sequence over a timed shared common path. Thus telephone stations 21–1 through 21–$n$ are selectively connected to a common transmission bus 200 through corresponding line gates 201–1 through 201–$n$, which gates are sampled on a selective basis for a predetermined time interval in a recurrent cycle of time intervals.

If a pair of gates is closed simultaneously for the prescribed time interval, a sample of the information available at each of the connected stations will be transferred to the other station via common transmission bus 200. Thus a bilateral connection is established which, although physically connected for only a small fraction of the time, appears to be continuously connected because of the smoothing action of filters in each line circuit.

Switch unit 20–1 informs control unit 13 via data link 40 of all changes in the supervisory status of telephone lines, trunks and attendant console keys, e.g. whether they are idle (on-hook) or busy (off-hook). Control unit 13 then performs all of the decision making tasks of call processing.

Interconnections (FIGS. 2 and 3)

Switch units 20–1 through 20–$n$ and 60 are each connected to control unit 13 by two types of transmission facilities. The first type is represented by trunks 30 and 71, the former including central office trunks 205–1 through 205–$n$, which connect time division bus 200 at switch unit 20–1 to the outside world via trunk circuits 319 in control unit 13. Included in trunks 30 and 71 are tie trunks which connect switch units 20–1 and 60 respectively to other PBX switch units such as 20–2 and 20–$n$ via control unit 13. Trunks 30 and 71 also include digit trunks such as 202. These trunks provide a transmission path from a calling station associated with one of the switch units to digit receivers, such as 309, in control unit 13 provided for registering call signaling information other than switch-hook flashes. Digit signals are transmitted from the calling station via the corresponding time division bus, such as 200 in switch unit 20–1, and the corresponding digit trunk gate such as 203 to the selected digit trunk 202.

The second type of transmission facility is the data link which comprises send and receive channels. Links 40 and 70 are illustrated, connecting switch units 20–1 and 60, respectively, with control unit 13. The data send channel is unidirectional, connecting the respective switch unit to control unit 13 for the purpose of transmitting data relating to changes in the supervisory status of stations associated with the switch unit to control unit 13. Similarly, the data receive channel is unidirectional and serves to transmit control signals for the establishment and disestablishment of connections through the respective switch unit from control unit 13. The data send channel originates in data transmitter 220 at switch unit 20–1 for example, and terminates in data receiver 301 included in the input-output section 300 of control unit 13. Similarly, the data receive channel for switch unit 20–1 originates in data transmitter 306 at control unit 13 and terminates in data receiver 230 at switch unit 20–1. Information is transmitted in both directions by means of frequency shift signals, i.e., signals of one frequency represent O's in a digital message and signals of a second frequency represent 1's in the digital message.

Also illustrated in FIG. 3 is the high speed data link 75 interconnecting data terminal equipment in central offices 11 and 51 in accordance with this embodiment of the invention as described 20–1 reference 20–4.

Control Unit 13 (FIG. 3)

Control unit 13 which may be as described in the aforementioned Vigliante et al. patent, performs all of the logical functions required to process calls through each of the remote switch units 20—1 through 20—n and 60. It may, for ease of description, be divided into two major sections, viz., input-output section 300, and call processing section 350, the former comprising equipment which communicates directly with each of the switch units and central offices associated with control unit 13, while the latter performs the actual processing required to establish and supervise calls at the switch units. Thus a single memory unit in input-output section 300 receives and stores information from all of the switch units and is capable of working with all of the switch units simultaneously. The call processing section, on the other hand, operates on one switch unit at a time and on one call at a time within a given switch unit. As each call is processed, any action required is formulated as a message and placed in the input-output section for transmittal to the proper switch unit. The two sections operate in independent time cycles. Also input-output section 300 comprises wired logic as contrasted with the stored program which controls call processing section 350. logic as contrasted with the stored program which controls call processing section 350.

The operation may be understood more fully upon consideration of a typical intra-PBX call. Assume telephone 21–1, FIG. 2, goes off-hook. This change of status is recognized by scanner 210 which in turn formulates a message containing the corresponding line number and the new supervisory state. This information is transmitted to control unit 13, FIG. 3, via data transmitter 220 and the send leg of data link 40.

Control unit 13, recognizing that there is no current call established which involves this particular line determines that the off-hook indication is a request for service and proceeds to set up a dialing connection. For this purpose a message is sent to switch unit 20–1 via the receive leg of data link 40, specifying that telephone 21–1 be connected to a preselected digit trunk 202. This message is received by data receiver 230 and transferred to network control 250 via data distributor 240. Network control 250 in turn, stores this message and translates it into an order to enable digit trunk gate 203 periodically to effect connection of station 21–1 to digit trunk 202 in a predetermined, recurring time interval. At the same time control unit 13 proceeds to connect digit trunk circuit 307 to a digit receiver 309 so as to transmit dial tone via digit trunk 202 to telephone 21–1.

Telephone 21–1 now proceeds to dial or otherwise transmit the digits representing the called telephone. Upon completion of dialing, control unit 13 sends a message to switch unit 20–1 which removes the connection to digit trunk 202 and establishes instead a ringing connection to the called telephone with audible ringing returned to telephone 21–1 by tones 260 via gate 261. When the called party answers, an off-hook message is sent to control unit 13 which returns a message to switch unit 20–1 to terminate ringing and to establish a talking connection.

All changes in supervisory states result in a data message being transmitted from scanner 210 in remote switch unit 20–1 to control unit 13 and an answering message from control unit 13 being received in switch unit 20–1 over data link 40. The latter message is utilized by network control 250 to establish the appropriate connections in a predetermined time slot in each cycle of time slots. The content of the received message also determines its distribution in switch unit 20–1, either to network control 250 or through attendant translator 270 to attendant console 22.

Input-Output Section 300 (FIG. 3)

Input-output section 300 of control unit 13 is arranged to handle three types of information. Incoming data is received in data receiver 301 and transferred to data and digit store 304 via an incoming data trunk 302 and data control 303. Outgoing data is taken from data and digit store 304 and transmitted to switch unit 20–1 via data control 303, an outgoing data trunk circuit 305 and data transmitter 306 or to the central office via sender control 311, trunk connecter 318 and trunk circuits 319. Call destination information, such as dial pulses, is stored in data and digit store 304 under control of digit control 310. The third type of information comprises commands from the call processing section which are utilized for supervision of the trunks connecting the various switch units to each other or to central offices with provision for the out pulsing of line designation digits over these outgoing trunks. Thus data and digit store 304 is required to store all data received from each switch unit and from call processing section 350 and to retain incoming and outgoing digits designating calling lines.

During the first part of each scan through data and digit store 304, the portions of store 304 associated with a group of digit receivers 309 are addressed in sequence concurrent with the addressing of the corresponding digit receiver. New information concerning the designation of called parties, if any, derived from such sampling, is placed in store 304 with the aid of digit control circuit 310. If the call with which the particular digit receiver 309 and the corresponding portion of store 304 are then associated requires outpulsing, as when the called party is located outside the switch unit terminating the calling line, the necessary information for outpulsing is extracted from store 304 during the period that digit receiver 309 is being scanned.

During each scan cycle following the portion devoted to observing digit receivers, switch unit data storage areas each comprising three outgoing message words and one incoming message word for each of the switch units 20–1 through 20–n and 60 are addressed sequentially by direction of data control 303. Simultaneously, data control 303 actuates corresponding incoming data trunk circuits 302 or outgoing data trunk circuits 305.

Data control 303 is associated with data store 304 in such a manner as to permit the orderly insertion and withdrawal of data and digits designating called lines. It also supports operations of digit control 310, sender control 311 and various components in call processing section 350. Routine addressing and scanning operations are performed by data control 303, subject to interruption at any time by call processing section 350 to remove data from store 304 for appropriate processing or to insert data therein for subsequent transmission to the appropriate switch unit.

Call Processing Section (FIG. 3)

Whereas input-output section 300 is arranged to monitor active and prospective calls in each of the switch units 20–1 through 20–n and 60 concurrently, call processing section 350, FIG. 3, processes a single call at a time. Processing of any one call involves a number of steps as the connection is being established and disestablished. Call processing section 350 maintains a record of each of these steps in the processing of a call, thus keeping itself currently advised as to the status of every call in the system.

The status of each call is observed periodically and compared with information received from input-output section 300 and the data terminal equipment depicted in FIG. 4, so as to maintain a current status record for each call, the recorded status being updated upon receipt of each new condition report as the temporary record is observed. Such call status records are maintained in call status control 322, one of the three major units in the call processing section.

A second major unit is program control 320. The record of each call maintained in call status control 322 contains a distinct indication as to the current state of a call indicative of the progress made to date in the establishment of the connection. As the status of each call is observed, this call status indication or progress mark is transmitted to program control 320 where it is utilized to address a storage unit designated program store 321. Such action triggers program store 321 to provide a chain of commands to equipment throughout call processing section 350 which eventually serves to update the information contained in call status control 322 and, in some instances, to provide operating instructions to input-output section 300 in order to permit implementation of the actual call connections in the switch units.

Thus call processing section 350 may be said to operate in accordance with a stored program. The primary characteristic of such program controlled system operations is the utilization of a program or series of commands permanently stored in the system, which commands are carried out by the system on a selective basis in accordance with instructions to the program in the form of addresses, each distinct address initiating a distinct series of commands.

The third major unit in the call processing section is line information control 323, which contains information concerning each line and trunk terminating on control unit 13, auxiliary matters such as class of service to which a particular line is entitled, abbreviated directory numbers, toll call diversion, compressed outpulsing translations, etc. Such information is available upon request by program control 320 as desired in the processing of a particular call. When interrogated, line information control 323 will deliver information to call status control 322, where further processing of the call will take place.

Call processing section 350 systematically interrogates input-output section 300 for new information concerning a particular call that is currently processing, such information including on- or off-hook messages, digit pulsing completed, etc. Following the instructions contained in program store 321, call processing section 350 interprets data received from the switch unit originating the particular call being processed, as temporarily stored in input-output section 300, and subsequently informs the same switch unit via input-output section 300 as to which connections to establish or disestablish in order to satisfy any change of status in the instant call. The call processing operation thus may be seen to comprise collecting information from the switch units, comparing such information with the current recorded status of a call, and advising the switch units to take appropriate action while updating the status of the call, each operation being under the control of instructions received from a stored program.

Centrex Services (FIGS. 2—4)

In order to appreciate the system operation utilizing the control unit at one exchange area to provide the essential services to a switch unit in another exchange area, it is necessary to understand the types of service initially provided by a control unit to the switch units in its own exchange area. Among these services are those now referred to as "centrex", indicating that services provided to individual telephone subscriber stations by the central office may now be provided directly to extension telephone stations of a PBX. Among these services are direct inward dialing (DID) and identified outward dialing (IOD). The former service permits calls from other exchange areas to reach a called PBX station without intervention by the PBX operator. One manner of performing this operation in a system including a common control unit serving a plurality of remote switch units is the subject of a U.S. Pat. application for R. W. Kirby et al. Ser. No. 588,379, filed Oct. 21, 1966, now U.S. Pat. No. 3,479,467, issued Nov. 18, 1969.

As described therein, direct inward dialing to stations of remote switch units, such as unit 20–1, FIG. 4, is achieved by providing a central office interface unit 410 which permits the central office marker 401 to communicate directly with control unit 13. Marker 401 furnishes the call directory number to control unit 13 which in turn translates the directory number independently of the marker and ascertains the central office equipment location of an idle trunk 205–1, serving the corresponding switch unit. Control unit 13 then transmits the identity of the selected trunk and the station corresponding to the called directory number to switch unit 20–1 over the corresponding data link 40. Control unit 13 also informs marker 401 of the equipment location of the selected trunk whereupon marker 401 establishes a cross-office connection between the trunk link frame TLF and line link frame LLF so as to complete the connection between incoming trunk 400, associated with the calling station, and PBX trunk 205–1, associated with the called station, via link 325. These operations are performed without requiring trunk hunting or other functions formerly required when establishing connections to PBX trunks. Since control unit 13 maintains a record of available PBX trunks and is responsible for selecting trunks both on calls originated at a remote switch unit as well as for calls incoming to switch units, the possibility of a PBX trunk being seized simultaneously from both ends is obviated.

In conventional PBX operation, outgoing calls utilize a specific digit such as nine to prefix the called station designation, the prefix nine being used by the PBX to seize a trunk to the central office which then bills the PBX trunk or customer. Identified outward dialing (IOD) permits the particular station at the PBX originating the outgoing call to be billed directly. This is accomplished simply by making use of the storage facilities in control unit 13 to transfer the stored identity of the calling station to the central office billing equipment 420 through IOD circuit 415.

Remote Exchange Connections (FIGS. 4—15)

In accordance with the illustrative embodiment of this invention, foreign exchange switch unit 60 is controlled by the control unit 13 in local exchange 10 while still having its trunks connected through exchange 50. This arrangement, of course, permits considerable saving in control equipment since a separate control unit is not required in foreign exchange 50. It is made possible by the employment of high speed data transmission links 420, FIG. 4, between the foreign and local exchanges, which links carry dial pulses, trunk control signals, and DID, IOD and maintenance messages.

Switch unit 60 is scanned for service requests in the same manner as the switch units in local exchange 10. The resultant information is transmitted to control unit 13 via data link 70 and upon completion of a connection to a digit trunk, included in trunks 71, the digits identifying the called station are transmitted from switch unit 60 to control unit 13. If a call from switch unit 60 is intended for the outside world and requires a central office or tie trunk connection, control unit 13 will transmit the called station identity when requested and trunk seizure information through multiplex and demultiplex logic 421, one of the data sets 422, the corresponding data link 420, the receiving data set 423 and multiplex and demultiplex logic 425 so as to deliver the dial pulses to the foreign exchange central office and to seize a desired central office trunk through trunk control circuit 455.

The IOD information also follows this transmission route and is directed through IOD circuit 460 in the foreign exchange central office. Similarly if a call from the outside world is to be directed to a station terminating on switch unit 60, the DID facilities 465 in the foreign exchange central office are utilized to direct information via data links 420 to control unit 13 for processing. Assignment of a particular central office trunk to complete the call connection to switch unit 60 is then effected by transmitting trunk seizure information back over data links 420 to trunk control 455.

The particular components required to facilitate these data transfers and the manner of organizing the various data transfers are described in detail with reference to FIGS. 5—15. As indicated heretofore, dial pulses received from a calling station at switch unit 60 are stored in data and digit store 304, FIG. 3, of control unit 13. The store may simultaneously contain the digits necessary to complete a number of call connections. This call connection information is scanned sequentially with a certain portion of each scan cycle being reserved for dial pulses. Thus in this illustrative embodiment, three digit storage areas corresponding to three distinct call connections are observed in sequence in each scan cycle.

A dial pulse requires 10–binary digits or bits for transmission over a data link 420. Thus if the scan produces three dial pulses, the transmission message will require 30 bits to convey dial pulse information. The seizure or release of a trunk also requires 10 bits and is next to dial pulses in priority for transmission. Thus if less than three dial pulses are available for transmission in a given cycle, the available space may be occupied by one or more trunk seize or release orders. Next in order of priority are DID messages occupying 28 bits followed by IOD messages of 24 bits and maintenance messages of 30 bits.

Since data and digit store 304 is used as an interface between switch units and control units, its timing cycle advantageously may be used to satisfy the foreign exchange operation in accordance with this illustrative embodiment of the invention. This cycle time is 1.36 milliseconds, of which the first 336 -microsecond interval is utilized for the scan of three digit registers. Upon completion of the digit register scan, a brief interval is available in which to decide whether dial pulses are available for transmission, and, if not, what other information may be available for transmission. Taking 4 microseconds to make this logic decision leaves 1.02 milliseconds in which to perform the actual data transmission before the next digit and data store scan cycle begins. This time period permits the transmission of 51 bits, and since the message requirement is for a maximum of 30 bits of information, 5 bits may be assigned to gating or routing of the information to the proper destination and 16 bits may be utilized for error detection.

Data sets 422 and 423 thus are required to transfer this information rapidly and accurately over data links 420. A parallel transfer would not be economically feasible, and the preferred serial transfer requires a transmission rate of 50 kilobits per second. As the particular data set is not of immediate concern with respect to the novel aspects of this disclosure, suffice it to say that a data set suitable for this purpose is available in the art, as noted, for example, in U.S. Pat. application Ser. No. 482,498 of R. D. Fracassi and T. Tammaru, filed Aug. 26, 1965. Although two data links are indicated, the number actually employed would depend largely on traffic requirements and economic considerations. Each link requires a distinct data set at each end. Messages then are assigned to the links on a selective basis.

The use of multiple data links also permits error checking by means of delayed message transmission. For this purpose the same message is transmitted over one channel a message length after its transmission over the other channel. The received messages are then compared to detect the presence of errors.

As noted in FIG. 5, dial pulse and trunk seize and release information is received in trunk connecter 318 from sender control 311 and program control 320 respectively, the former indicating the results of a scan through data and digit store 304. The trunk control data is transmitted through trunk connecter input gating circuit 501 to trunk number register 502. Similarly dial pulse information is transmitted through input gates 503 to trunk number register 502.

The information stored in register 502 is then translated by switch unit number translator 505 and trunk number translator 506. The results of these translations are utilized to direct the received information to the desired destination. In this instance the output of switch unit number translator 505 is applied to translator 510 via output AND gate 508, indicating that a foreign exchange switch unit is to receive information. The output of AND gate 508 is returned to trunk number register 502 where it inhibits the normal trunk connecter operation but permits the transmission of the information to the foreign exchange.

Figure 6:
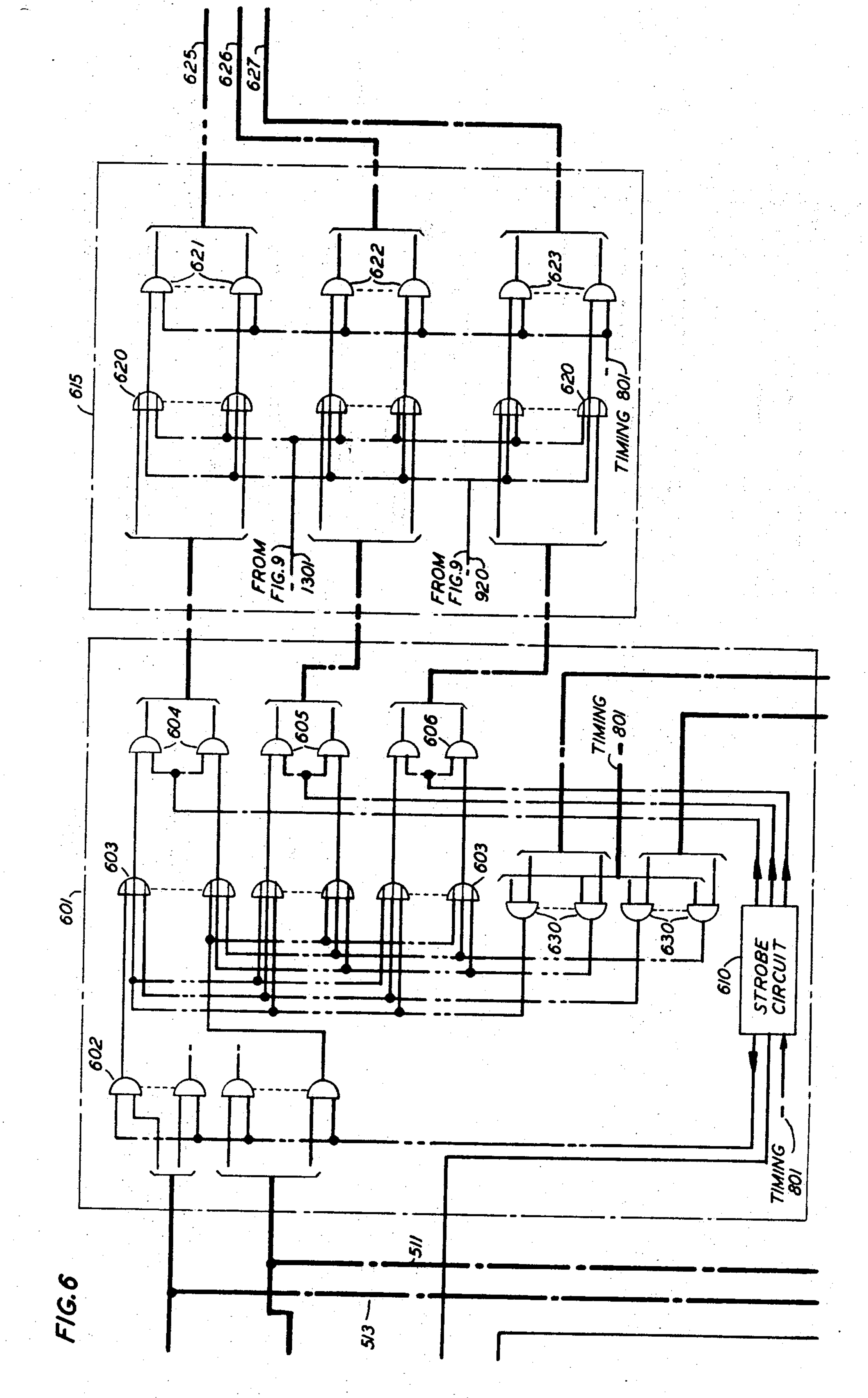

The output of trunk number translator 506 includes a coded dial pulse or identifies a particular foreign exchange trunk. This information, together with the output of translator 510 on lead 511, which identifies the particular foreign exchange switch unit involved, is directed to steering gates 601 (FIG. 6). Trunk number register 502 also may supply one bit on lead 515 to indicate whether the identified trunk is to be seized or released.

Sender control 311 provides an indication on lead 520 through input gates 503 when a coded dial pulse is being transmitted. Similarly, program control 320 provides an indication on lead 521 through input gates 501 when a trunk seizure or release is required. These indications together with an output from AND gate 508, signaling the involvement of a foreign exchange switch unit, will produce a dial pulse or trunk control output indication in AND gates 525. The dial pulse control indication is directed over lead 526 to strobe circuit 610 in steering gate circuit 601 which, in turn, directs the dial pulse information from register 502 through a series of AND gates 602 and OR gates 603.

Since up to three dial pulse indications may be received in a single time cycle, each of which concerns a different called station reached through the foreign exchange central office, strobe circuit 610 is controlled so as to enable the three distinct groups of AND gates 604, 605 and 606 in sequence. Thus a first coded dial pulse indication will be directed through AND gates 602, OR gates 603 and AND gates 604. The second coded dial pulse to be transmitted in this cycle, will also pass through AND gates 602 and OR gates 603, but strobe circuit 610 will determine its passage through AND gates 605. Similarly, a third coded dial pulse received in this cycle, will be directed through AND gates 606.

These coded dial pulses are next applied to a series of logic input gates including OR gates 620 and AND gates 621—623. The output of AND gates 621 on leads 625 are reserved for the first coded dial pulse to be transmitted in this cycle since such information claims top priority in the output message. AND gate 622 provide outputs on lead 626 which may refer to a second dial pulse or to a trunk control operation. Similarly AND gates 623 provide an indication on leads 627 of a third dial pulse or a second trunk control signal. Furthermore, in the absence of a dial pulse or a trunk control signal in any given cycle, a DID or IOD message may be transmitted through OR gates 620 and AND gates 621—623, as described hereinafter.

Figure 7:
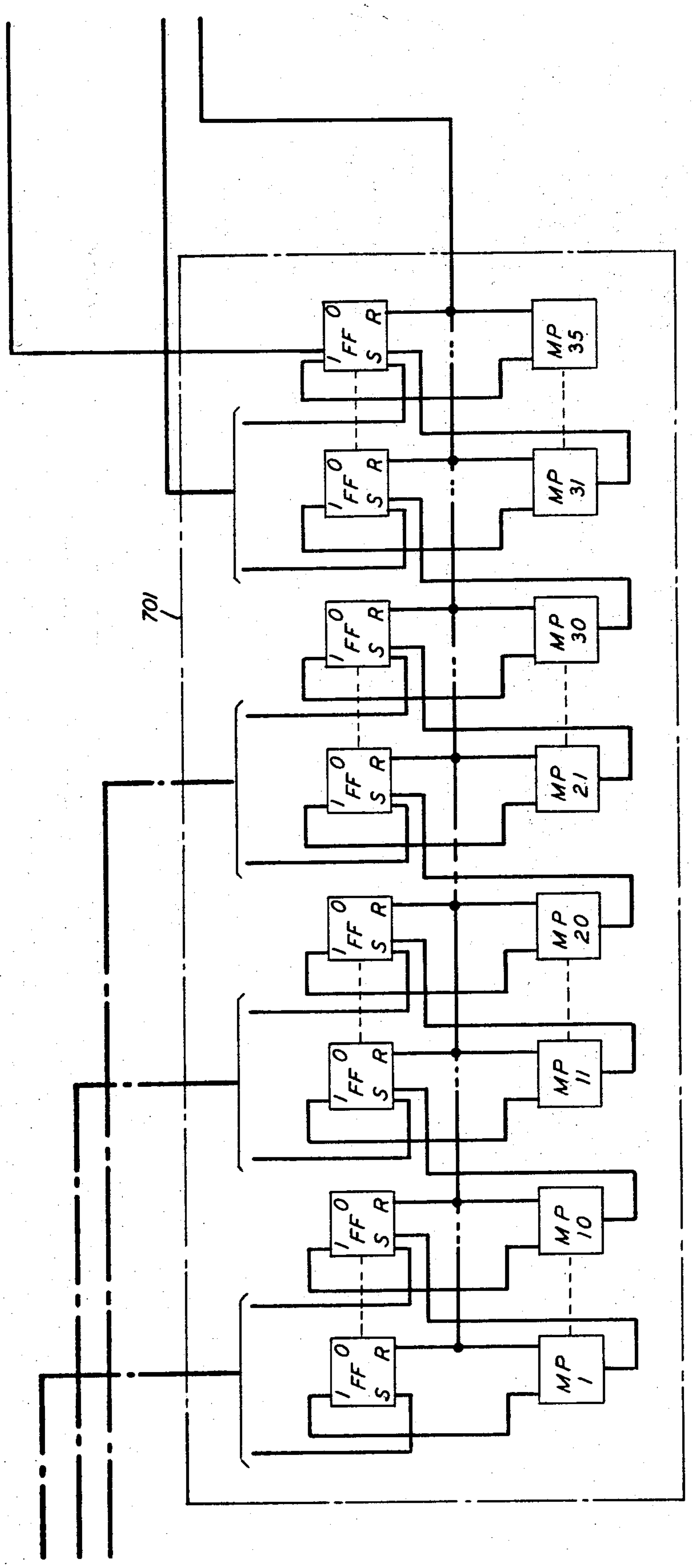

Returning then to the dial pulse transmission and assuming that three coded dial pulse indications are received in a given cycle, each of leads 625, 626 and 627 will contain individual messages which are stored in respective groups of flip-flops in shift register 701, FIG. 7. Upon receipt of timing signals from data loading logic 801 on lead 802, shift register 701 directs the stored information in sequence through logic circuit 805, which serves to insert error detection signals from coder 810 in the outgoing pulse train. The information is then stored in data link interface 815 until requested by data set 422 for high speed transmission in a serial pulse stream to the foreign exchange. The signals on lead 803 from data loading logic 801 control the outpulsing of logic circuit 805, and the signals on lead 804 provide routing information to register 701 for use in the outgoing message.

Figure 9:
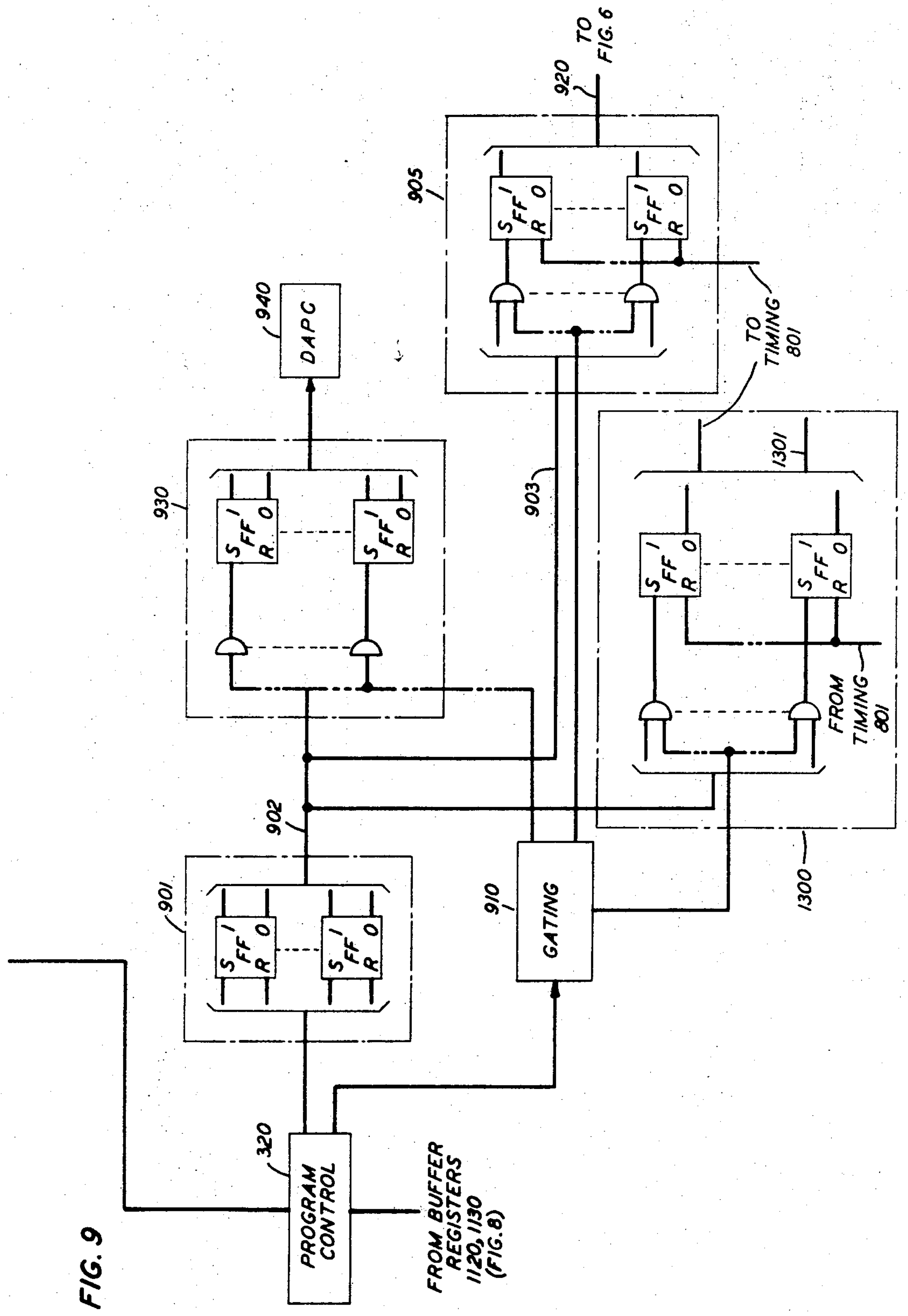
Figure 10:
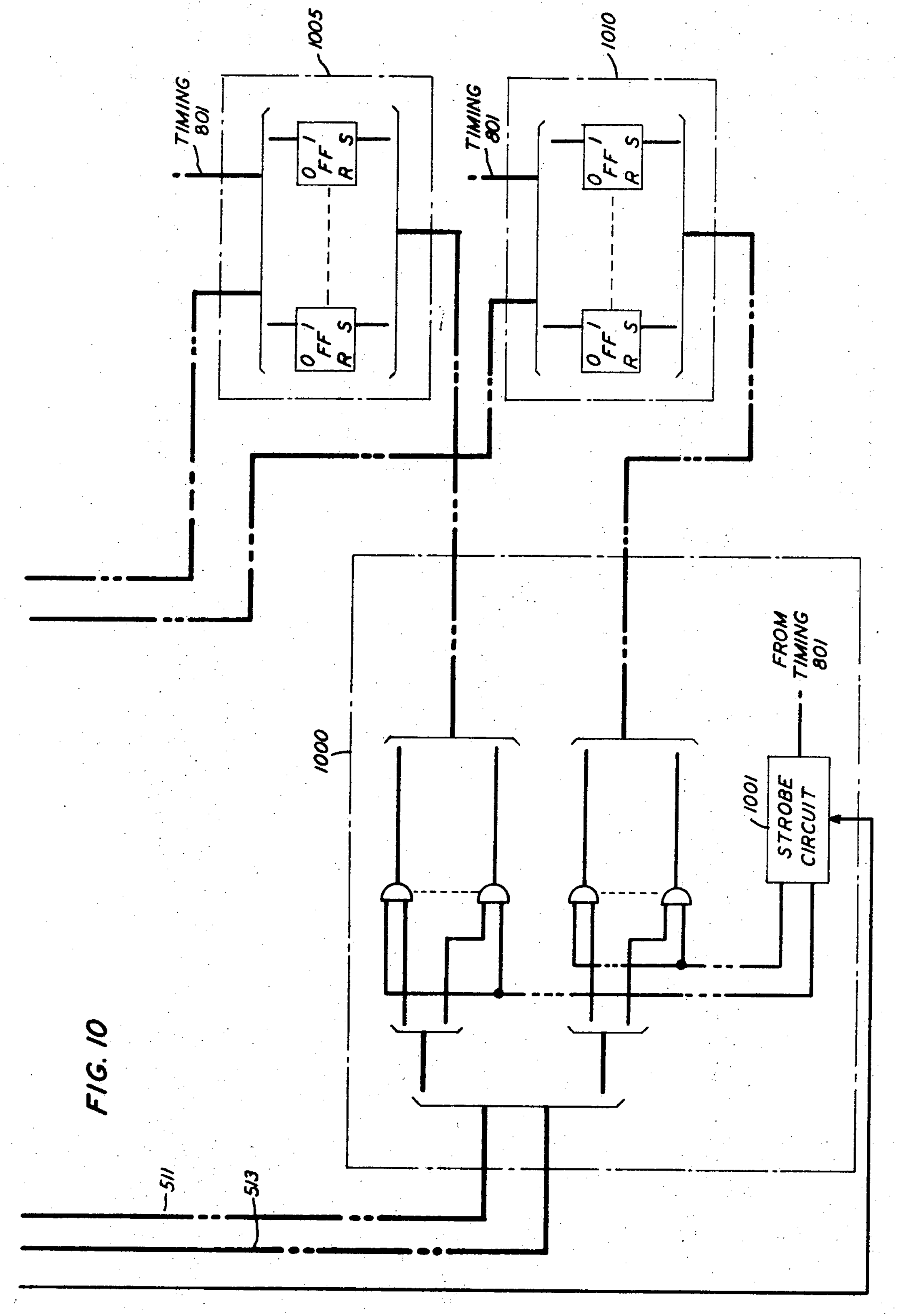

Trunk control messages follow a path from program control 320, FIG. 9, through input gates 501, FIG. 5, in trunk connecter 318, to store the trunk number in register 502. The resultant output of circuit 508, identifying a foreign exchange operation, is then applied to AND gates 525 together with the trunk control signal on lead 521. The resultant output signal on lead 527 enables strobe circuit 1001 in steering circuit 1000, FIG. 10, to direct the trunk identity information received on leads 511 and 513 to one of the buffer registers 1005 and 1010. One output of each of these registers alerts control timing circuit 801 to the busy or idle condition of the corresponding register. Upon determination in any given cycle of operation that space is available for transmission of a trunk control message, due to the presence of less than three dial pulses, the trunk control message may be directed from one or both registers 1005 and 1010, through the corresponding AND gates 630, OR gates 603 and AND gates 604, 605 or 606 in steering circuit 601. Input gates 615 then deliver the messages to designated portions of register 701, after which the signals follow the same path to data link 420 as described for the dial pulses.

In the absence of dial pulses and trunk control signals, a DID or IOD message may be transmitted over the data link. Each of these message types will appear in call status store output register 901, FIG. 9. Upon command from program control 320, the IOD message is directed to buffer register 905 via leads 902 and 903 in conjunction with an enabling signal from program control 320 through gating circuit 910. Upon receipt of a timing signal from control timing circuit 801, buffer register 905 will apply the IOD message on output lead 920 to OR gates 620, where the 24 message bits will be passed simultaneously through AND gates 621—623 to register 701.

Similarly, a DID message appearing in call status store output register 901 will, on command from program control 320, be directed via output leads 902 to buffer register 1300, such that upon receipt of a further command through gating circuit 910, the DID message will be directed via lead 1301 to OR gates 620. In this instance the 28 bits comprising a DID message will be applied to the corresponding number of OR gates 620. In addition the DID message is directed to a buffer register 930 in the local exchange central office from call status store output register 901, such that upon receipt of the control signal through gating circuit 910 the DID message also is applied to pretranslator connecter 940 in the local exchange central office. In this instance, of course, the DID message is intended for use in establishing connections through the switching network of the local exchange central office.

Figure 8:
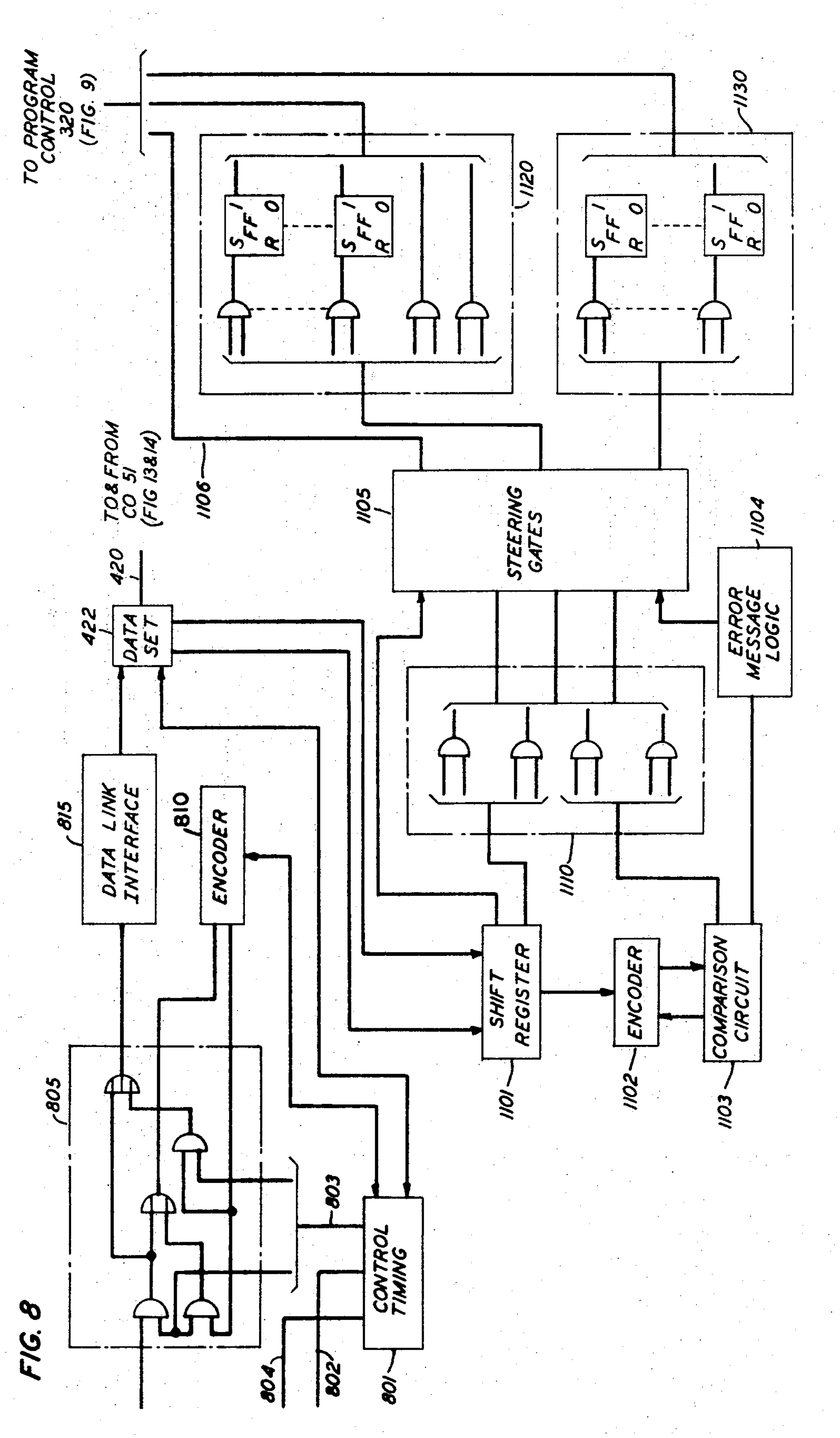

FIG. 8 also illustrates the equipment required in the local exchange central office to receive messages transmitted over data links 420 from the foreign exchange. The 51–bit message including 30 bits of information, 5 routing bits and 16–error detecting bits is directed to shift register 1101 by data set 422. The operation thereafter is substantially the reverse of the outgoing message operation, viz., the 30 message bits are directed through steering gates 1105 under control of gating circuit 1110, which derives its inputs from the 5 gating bits and the error detection signal comparison resultant received via coder 1102 and comparison circuit 1103. If an error is detected, comparison circuit 1103 applies a control signal through send error message logic 1104 to permit steering gates 1105 to direct the message via lead 1106 to program control 320 requesting a re-run or a maintenance check to determine the cause of the error. The DID message is directed by steering gates 1105 to buffer register 1120, and an IOD message is directed to buffer register 1130. Thereafter the DID message will be applied to program control 320 and the IOD message to call status control 322 for subsequent action by the control unit as appropriate.

In the foreign exchange central office, the equipment required for receiving and sending data via data links 420 corresponds to that contained in the local exchange. Thus data set 423, FIG. 13 receives 51-bit messages from local exchange 10 via links 420 and stores them in shift register 1501. The 30 information bits are then directed through steering gates 1502 under control of the 5 routing bits and the error detection comparison resultant as supplied through gating circuit 1503. Two-stage counter 1510 also assists in the steering operation to assure a proper sequence of messages through steering gates 1502. Trunk connecter 1515 subsequently seizes or releases the indicated trunk at trunk control circuit 455 or transfers dial pulses therethrough as directed by a received message. DID messages, when present, are directed to DID circuit 465 and IOD messages to IOD circuit 460 in the foreign exchange central office.

In FIG. 14 the data sending operation for the foreign exchange is illustrated. Again the operation parallels that described for the local exchange. Thus, DID and IOD messages are gated through OR gates 1605 to message shift register 1610, whereupon routing bits and error detection bits are added and the message delivered through data set 423 to the local exchange. The one distinction in this instance is the employment of scanner 1620 which is linked with comparison circuit 1506 and gating circuits 1601 and 1602 handling DID and IOD messages respectively. If a message containing an error previously was received from the local exchange, scanner 1620 will arrange to send an error maintenance message to the local exchange. Also scanner 1620 will deliver the routing bits to shift register 1610 upon receipt of the proper gating signals 1601 and 1602.

It is to be understood that the above-described arrangements are merely illustrative of the numerous and varied other arrangements which may constitute applications of the principles of the invention. Such other arrangements may readily be devised by those skilled in the art without departing from the spirit or scope of this invention.

We claim:

1. A communication system comprising a plurality of stations, a first and a second switch unit each terminating a distinct group of said stations, a first switching center serving said first switch unit in a local geographical area, a control unit in said local switching center for directing station interconnections through said local switch unit and said local central office, said second switch unit being in a foreign geographical area distinct from said local area, a second switching center in said foreign area for connecting stations terminating on said second switch unit with other stations, and means including said control unit in said local switching center for directing the establishment of connections to said stations terminating on said second switch unit through said second switch unit and said second switching center.

2. A communication system comprising a plurality of stations, a plurality of switch units each terminating a distinct group of said stations, a central office serving certain of said switch units contained in a local exchange area, a control unit in said local central office for directing station interconnections through said local switch units, at least one other switch unit in a foreign exchange area distinct from said local area, a central office in said foreign area for connecting stations terminating on said foreign switch unit with others of said plurality of stations, and means including said control unit in said local central office for establishing intraswitch unit connections among stations terminating on said other switch unit in said foreign area independent of said foreign central office.

3. A communication system in accordance with claim 2 further comprising means including said control unit for notifying said foreign central office of the busy or idle status of a station terminating on said foreign switch unit.

4. A communication system in accordance with claim 2 wherein said establishing means comprises data links between said control unit and said foreign exchange switch unit for exchanging supervisory and control information independent of said foreign central office.

5. A communication system in accordance with claim 4 wherein said establishing means comprises digit trunks connected between said control unit and said foreign exchange switch unit for receiving dial tone from said control unit and for transmitting dial pulses identifying called stations to said control unit independent of said foreign central office.

6. A communication system in accordance with claim 4 and further comprising means including said control unit for connecting said foreign exchange switch unit with said foreign exchange central office.

7. A communication system in accordance with claim 6 wherein said connecting means comprises second data links, said second data links being between said foreign exchange central office and said control unit for exchanging direct inward and identified outward dialing information and for transmitting trunk control signals from said control unit to said foreign central office.

8. A communication system in accordance with claim 7 wherein said connecting means further comprises means for multiplexing dial pulse, trunk control, direct inward dialing and identified outward dialing information on said second data links.

9. A telephone system comprising a central office serving a local exchange area, a control unit in said local central office for recording the status of calls and for directing line interconnections through remote switch units, a switch unit in a foreign exchange area, a foreign exchange central office for performing the billing and trunking functions for lines terminating on said foreign exchange switch unit, and means interconnecting said local central office and said foreign exchange central office for utilizing said control unit to perform the control functions necessary to the interconnection of lines and trunks terminating on said foreign exchange switch unit.

10. A communication system comprising a plurality of stations, a plurality of switch units each terminating a distinct group of stations, a first central office serving said switch units contained in a local exchange, a control unit in said first central office, a second central office distinct from said local exchange and serving certain of said switch units, and means for interconnecting said first and second central offices including means connecting said certain switch units directly to said local control unit to interchange information for the establishment of station interconnections through said certain switch units and said second central office.